(12) United States Patent
Houston

(10) Patent No.: US 11,414,859 B2
(45) Date of Patent: Aug. 16, 2022

(54) METHOD AND APPARATUS FOR MONITORING A BUILDING

(71) Applicant: BIG TIME INVESTMENT, LLC, Southfield, MI (US)

(72) Inventor: Stephen T. Houston, Lake Orion, MI (US)

(73) Assignee: BIG TIME INVESTMENT, LLC, Southfield, MI (US)

(*) Notice: Subject to any disclaimer, the term of this patent is extended or adjusted under 35 U.S.C. 154(b) by 671 days.

(21) Appl. No.: 16/422,374

(22) Filed: May 24, 2019

(65) Prior Publication Data
US 2020/0370295 A1  Nov. 26, 2020

(51) Int. Cl.
*G05B 15/02* (2006.01)
*E04B 1/92* (2006.01)
*G01M 5/00* (2006.01)
*E04H 9/02* (2006.01)

(52) U.S. Cl.
CPC ............. *E04B 1/92* (2013.01); *E04H 9/0215* (2020.05); *G01M 5/0066* (2013.01); *G05B 15/02* (2013.01)

(58) Field of Classification Search
CPC ........... E04B 1/92; E04H 9/02; E04H 9/0215; G01M 5/0066; G05B 15/02; G05B 2219/2642
See application file for complete search history.

(56) References Cited

U.S. PATENT DOCUMENTS

| | | | |
|---|---|---|---|
| 3,283,465 A | 11/1966 | Cheskin | |
| 4,071,988 A | 2/1978 | Bowes | |
| 4,429,496 A * | 2/1984 | Masri | E04B 1/98 52/167.2 |
| 8,423,300 B1 | 4/2013 | diGirolamo | |
| 10,042,341 B1 * | 8/2018 | Jacob | E04B 1/92 |
| 2010/0271199 A1 | 10/2010 | Belov et al. | |
| 2013/0132032 A1 | 5/2013 | McKeown | |
| 2016/0340856 A1 | 11/2016 | Conner et al. | |
| 2017/0218614 A1 * | 8/2017 | Ciuperca | E04G 9/10 |

(Continued)

FOREIGN PATENT DOCUMENTS

CN  107194830 A  9/2017

OTHER PUBLICATIONS

Brownjohn "Structural Health Monitoring of Civil Infrastructure" (Year: 2016).*

(Continued)

*Primary Examiner* — Yuhui R Pan
(74) *Attorney, Agent, or Firm* — Quinn IP Law

(57) ABSTRACT

A multi-story building is described, and includes a vertical support core disposed on a foundation, and a plurality of floor plates disposed on the vertical support core in a stacked arrangement. A plurality of sensors are disposed to monitor the vertical support core and the plurality of floor plates. A controller is in communication with the plurality of sensors, and includes a memory device including an instruction set that is executable to determine baseline inputs for the plurality of sensors, dynamically monitor in-use inputs for the plurality of sensors, evaluate the multi-story building based upon the baseline inputs and the in-use inputs from the plurality of sensors and communicate the evaluation to a second controller.

23 Claims, 2 Drawing Sheets

(56) References Cited

U.S. PATENT DOCUMENTS

2021/0047825 A1* 2/2021 Mou .................. G01M 5/0083

OTHER PUBLICATIONS

Kamada et al. "Active vibration control of frame structures with smart structures using piezoelectric actuators (Vibration control by control of bending moments of columns)" from "1997 Smart Materials and Structures 6 448" (Year: 1997).*
Brown, John, "Structural health monitoring of civil infrastructure." Philosophical Transactions of the Royal Society A Mathematical, Physical and Engineering Sciences 365.1851 (2007): 589-622; Fig 9, sections 3.4, 4.4.
International Search Report issued in International Application No. PCT/US20/32949 dated Aug. 18, 2020.

* cited by examiner

METHOD AND APPARATUS FOR MONITORING A BUILDING

TECHNICAL FIELD

The disclosure generally relates to monitoring a building.

BACKGROUND

Many methods of constructing multi-story buildings exist. One known method for constructing multi-story buildings is a bottom-up strategy, in which construction of the building begins on a ground level by attaching higher elevation structural elements on top of previously assembled lower structural elements to construct the building in an upward direction. This construction method requires that the structural elements be lifted by cranes and connected in situ at elevation. This may be particularly time-consuming and costly when constructing tall buildings.

Selected systems currently exist to provide localized automated control of various building elements, including window shading devices in response to solar loads, light fixtures to control lighting levels in response to occupancy, available daylight, or both, and computerized elevator controllers that permit the coordinated, demand-based operation at maximum efficiency. Such systems reduce wait times and energy consumption. At a more complex level, building automation systems (BAS) have focused on the automated control of heating, ventilating, and air conditioning systems (HVAC). These systems use temperature sensing devices in combination with an electric valve and damper actuators to measure and control HVAC equipment (i.e., boilers, chillers, air handling units, terminal units and similar equipment) for the purpose of remotely setting and maintaining a preprogrammed thermal environment throughout the building. Systems are programmed to control temperatures in different building zones subject to different internal and external thermal loads. Systems are programmed to reduce temperatures at times when the building is not expected to be occupied, such as evenings, weekends and holidays to facilitate energy use reduction.

Building automation systems may divide a building into a plurality of tiers which communicate with each other. By way of non-limiting example, a lowest level tier may include terminal controllers for controlling individual devices, e.g., boiler, chiller, cooling tower, and variable air volume boxes. An intermediate level incorporates a system controller for coordinating the control of the individual devices to manage power loads, etc. An upper level includes a central computer workstation that receives, processes, stores, and sends data for long-term analysis and management.

There is a need for a system that can monitoring parameters related to structural integrity and environmental health of the building, during fabrication and in-use.

SUMMARY

A multi-story building is described, and includes a vertical support core disposed on a foundation, and a plurality of floor plates disposed on the vertical support core in a stacked arrangement. A plurality of sensors are disposed to monitor the vertical support core and the plurality of floor plates. A controller is in communication with the plurality of sensors, and includes a memory device including an instruction set that is executable to determine baseline inputs for the plurality of sensors, dynamically monitor in-use inputs for the plurality of sensors, evaluate the multi-story building based upon the baseline inputs and the in-use inputs from the plurality of sensors and communicate the evaluation to a second controller.

An aspect of the disclosure includes an active structural element being interposed between adjacent ones of the plurality of floor plates, wherein the active structural element is in communication with the first controller. The instruction set is executable to control the active structural element based upon the in-use inputs from the plurality of sensors. This includes monitoring vibration and controlling the active structural element to damp the vibration. This includes monitoring deflection and controlling the active structural element to minimize or control the deflection.

Another aspect of the disclosure includes the instruction set being executable to evaluate structural integrity of the multi-story building based upon the baseline inputs and the in-use inputs from the plurality of sensors.

Another aspect of the disclosure includes the instruction set being executable to evaluate structural integrity of the multi-story building during building fabrication based upon the baseline inputs and the in-use inputs from the plurality of sensors.

Another aspect of the disclosure includes the instruction set being executable to evaluate structural integrity of the multi-story building in-use based upon the baseline inputs and the in-use inputs from the plurality of sensors.

Another aspect of the disclosure includes the instruction set being executable to evaluate environmental health of the multi-story building based upon the baseline inputs and the in-use inputs from the plurality of sensors.

Another aspect of the disclosure includes the instruction set being executable to dynamically evaluate environmental health of the multi-story building based upon inputs from the plurality of sensors, and communicate the evaluation of the environmental health to the second controller.

Another aspect of the disclosure includes the plurality of sensors including a plurality of accelerometers that are disposed to monitor the vertical support core, a plurality of first strain gages that are disposed to monitor floor plate lock points of the vertical support core, a plurality of second strain gages that are disposed to monitor the girders of the floor plates, horizontal deflection sensors that are disposed on each of the floor plates to monitor horizontal level of the respective floor plate, and plumb/twist sensors that are disposed on vertically-disposed structural rails of the vertical support core.

Another aspect of the disclosure includes the instruction set being executable to evaluate structural integrity of the multi-story building based upon baseline inputs and in-use inputs from the plurality of accelerometers, the plurality of first strain gages, the plurality of second strain gages, the horizontal deflection sensors, and the plumb/twist sensors.

Another aspect of the disclosure includes the plurality of sensors including a plurality of vibration sensors that are disposed to monitor vibration in the floor plates of the building, a plurality of ambient and internal temperature sensors, ambient pressure sensors, moisture sensors, and a plurality of motion sensors that are disposed to monitor the plurality of floor plates to monitor effects of dynamic loads.

Another aspect of the disclosure includes the instruction set being executable to evaluate environmental health of the multi-story building based upon baseline inputs and in-use inputs from the vibration sensors, the plurality of ambient and internal temperature sensors, the ambient pressure sensors, the moisture sensors, and the plurality of motion sensors.

Another aspect of the disclosure includes the instruction set being executable to dynamically evaluate the structural integrity of the building based upon inputs from the plurality of strain gages that are disposed to monitor floor plate lock points of the vertical support core.

Another aspect of the disclosure includes a plurality of accelerometers that are disposed to monitor the vertical support core.

Another aspect of the disclosure includes a plurality of strain gages that are disposed to monitor floor plate lock points of the vertical support core.

Another aspect of the disclosure includes a plurality of strain gages that are disposed to monitor the floor plate assembly.

Another aspect of the disclosure includes the instruction set being executable to dynamically evaluate the structural integrity of the building based upon inputs from the plurality of strain gages that are disposed to monitor the girders of the floor plates.

Another aspect of the disclosure includes a method for operating a multi-story building including a vertical support core having a plurality of floor plates disposed thereon in a stacked arrangement, wherein the method includes disposing a plurality of sensors onto the vertical support core and the plurality of floor plates, monitoring inputs from the plurality of sensors, evaluating the multi-story building based upon the inputs from the plurality of sensors, and communicating the evaluation to a second controller.

The above features and advantages and other features and advantages of the present teachings are readily apparent from the following detailed description of the best modes for carrying out the teachings when taken in connection with the accompanying drawings.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
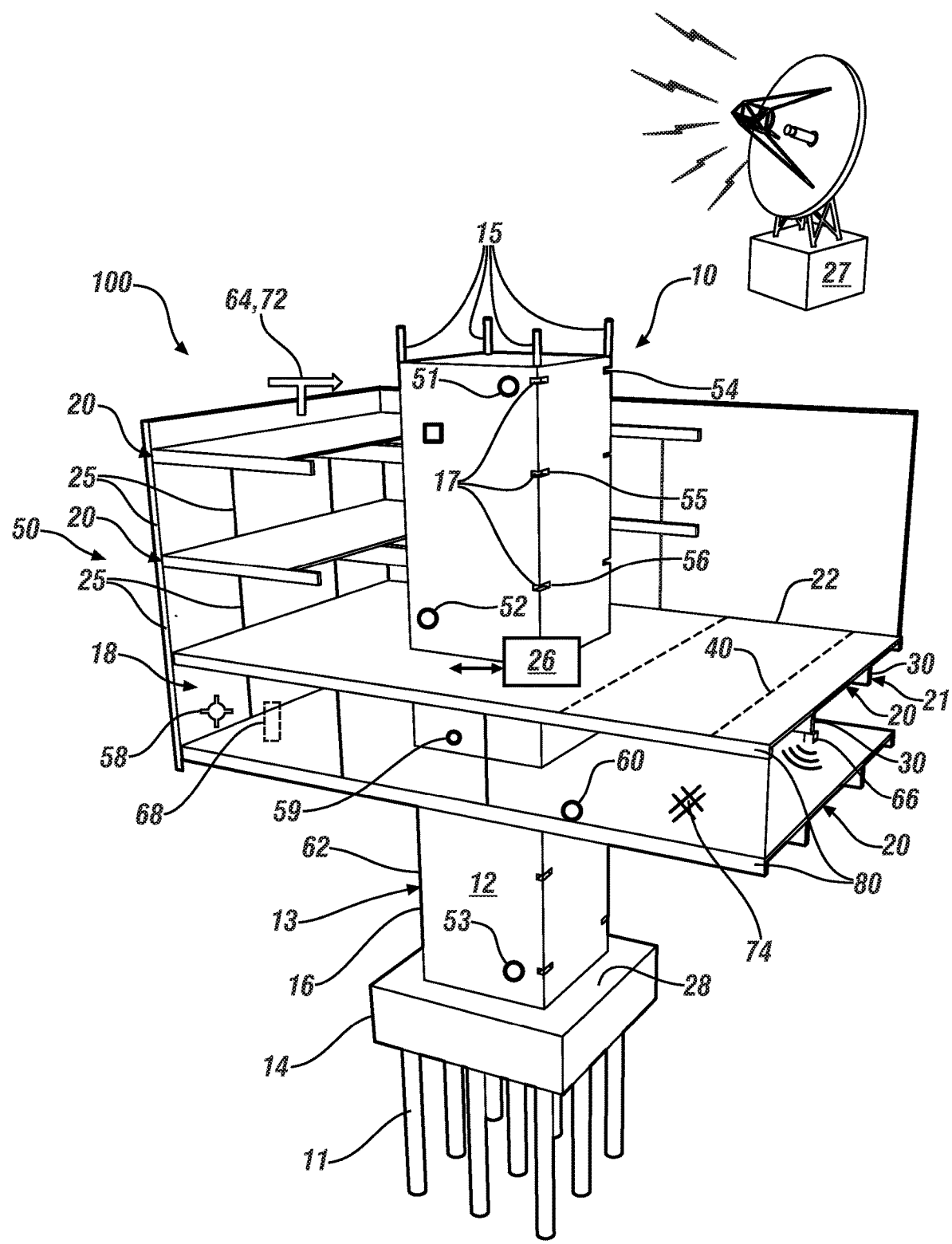
FIG. 1 is a schematic perspective view of a partially constructed building, in accordance with the disclosure.

FIG. 1 schematically shows elements of a multi-story building 100 that has been fabricated employing a top-down construction system 10. The multi-story building 100 includes a vertical support core 12, which is assembled onto a foundation 11, and a plurality of floor plates 20. In general, the construction system 10 may be used to implement a top-down construction process, in which individual floor plates 20 are constructed at a ground elevation 14, lifted to a respective final elevation, and attached to the vertical support core 12 of the building 100 at floor plate lock points 17. The individual floor plates 20 are assembled and placed in a descending, sequential order. The foundation 11 may be in the form of a pile foundation that includes a plurality of columnar elements that are inserted into the ground. As used herein, the term "floor plate 20" may include all structural or frame members, e.g., joists and/or purlins, flooring, e.g., concrete floor, interior walls, exterior curtain walls, modular room subassemblies, e.g., a lavatory module, utilities, etc., that form a floor or level of the building 100. The floor plate 20 may include a plate for the roof structure of the building 100, as well as a plate for a floor or level of the building 100.

The construction system 10 includes the vertical support core 12, which is an element of a vertical slip form system 13. The vertical support core 12 includes one or a plurality of vertically-disposed structural rails 16. The vertical slip form system 13 is operable to form the vertical support core 12 of the building 100 from a hardenable material while moving vertically upward from the ground elevation 14 to a finished elevation. The hardenable material may include, but is not limited to, a concrete mixture or another similar composition. Parameters associated with the hardenable material include density, modulus of elasticity, compressive strength, tensile strength, and shear strength, any and all of which may change during curing. The hardenable material is initially in liquid form when being poured, and undergoes a curing process to harden in place. The curing process is exothermic, meaning that the temperature of the hardenable material increases during the hardening. The specific type and contents of the hardenable material are understood by those skilled in the art, as are the associated material properties and curing properties.

The vertical support core 12 is designed to carry the vertical loads of the building 100. As such, the shape of the vertical support core 12 may be designed as necessary to provide the required compressive strength, shear strength, and bending strength for the particular application, size, and location of the building 100. The wall of the vertical support core 12 may be configured to include multiple load bearing columns, i.e., structural rails 16, which are connected by shear walls. In other embodiments, the wall of the vertical support core 12 may be designed to include a generally uniform construction around the entire perimeter of the vertical support core 12.

As shown in FIG. 1, the construction system 10 may further include one or a plurality of lifting device(s) 15 attached to the roof structure, which may be used for raising the roof structure and the floor plates 20 relative to the vertical support core 12. For example, the lifting devices 15 may include, but are not limited to a plurality of strand jacks. However, the lifting devices 15 may include other devices capable of lifting each of the floor plates 20 of the building 100. The strand jacks grasp and move a cable to lift heavy objects. The specific features and operation of the strand jacks are known to those skilled in the art, are not pertinent to the teachings of this disclosure, and are therefore not described herein. The roof structure and each of the floor plates 20 may be assembled at ground elevation 14 and lifted into their respective final elevations relative to the vertical support core 12 in a sequential descending order, as is understood by those skilled in the art.

Each of the floor plates 20 includes a floor plate assembly 21 on which hardenable material 22 is poured and cured. The floor plate assembly 21 may be assembled as a woven structure in the form of main framing members e.g., girders 30, a plurality of transversely-oriented continuous framing members 40, spandrels 80, and a subfloor webbing on which hardenable material is poured and cured. The spandrels 80 are disposed at an outer periphery defined by the girders 30 and the framing members 40, and vertically-oriented exterior walls 18 are advantageously assembled thereon. The term "floor plate 20" is used herein to refer to both a roof structure for the roof of the building 100, as well as a floor structure for a floor or level of the building 100. As used herein, the reference numeral 20 may refer to and indicate each of the floor plates 20 of the building 100. Each of the floor plates 20 is assembled a few feet above ground level and lifted to its design elevation employing one or more of the lifting devices 15 or other vertical conveyance structure(s), and permanently affixed to and supported by the vertical support core 12. The floor plates 20 are cantilevered, and the weight of each of the floor plates 20 may be distributed symmetrically around the vertical support core 12 and the lifting devices 15. Alternatively, the floor plates 20 may be designed asymmetrically around the vertical support core 12 and the lifting devices 15 so long as proper design and loading techniques are utilized.

The building 100 may be subjected to loads, internal operating conditions, and environmental conditions that may affect its structural integrity and its environmental health. These include, by way of non-limiting examples, wind loads, solar loads, ambient temperatures and temperature changes, seismic loads, differential settling, and natural catastrophic events such as tornadoes, hurricanes, and earthquakes. These may also include air conditioning and ventilation loads, lighting loads, dynamic load shifting, security, fire protection, and insolation. The individual loads, internal operating conditions, and environmental conditions may affect parameters associated with the building 100 in a manner that may benefit from monitoring and mitigation in-use.

Structural integrity, as used herein, refers to the capability of the building 100 or a structural element thereof, to remain intact under load without exceeding elastic deformation limits, i.e., without fracturing, rupturing, bending, deforming, dislocating, or otherwise experiencing permanent deformation. Such elements can be associated with the hardenable material parameters, and include density, modulus of elasticity, compressive strength, tensile strength, and shear strength, and thus may be measured directly or inferred from measured data.

Factors associated with the structural integrity and environmental health of the building 100 may be taken into consideration throughout its life-cycle, including phases associated with building design, fabrication, and in-use. During the design phase, information gained during the operation of previously constructed and operated buildings can be used to validate and adjust the premises and practices engineers use to design buildings. During the fabrication phase, sensors may be employed to collect data to validate expected physical responses of each floor plate 20 in its permanently supported condition, including, e.g., flatness tolerances, floor plate geometry, stress and strains in connections or bearing points and other data. Furthermore, collected data may be used to test an engineering model against in-use performance of the elements of the building, including, e.g., the floor plates 20, connections, bearing points and similar building elements. This may include evaluating each of the floor plate lock points 17 to determine that the lock-in is structurally sound. Furthermore, during the fabrication phase, results achieved for previous lifted floor plates 20 that are in-place may be employed to inform and possibly modify the fabrication of each of the successively-assembled floor plates 20. In-use, after construction has been completed, the sensing devices 50 may provide data related to its structural integrity and health of the building 100 in response to effects of the external environment during routine operation such as thermal cycles, wind loads, and occupancy-related loads. Occupancy-related loads may include, e.g., cyclical equipment loads and vibrations, dynamic loads related to moving people and materials, loads induced by natural events including earthquakes, hurricanes, tornadoes, and fire.

The building 100 includes an in-building controller 26, which monitors inputs from each of the sensing devices 50 to dynamically monitor parameters associated with the building 100 to evaluate its structural integrity and environmental health. The in-building controller 26 can evaluate structural integrity and environmental health of the building 100 based upon baseline inputs and the in-use inputs from the sensing devices 50 during fabrication and while in-use. The in-building controller 26 can communicate such evaluation to a second, off-site controller 27.

The sensing devices 50 may include one or a plurality of accelerometers 51, 52, 53; one or a plurality of strain gages 54, 55; one or a plurality of vibration sensors 56; one or a plurality of ambient and internal temperature sensors 58, 59, respectively; one or a plurality of horizontal deflection sensors 60; one or a plurality of plumb/twist sensors 62; one or a plurality of wind load sensors 64; one or a plurality of motion sensors 66; one or a plurality of solar load sensors 68; one or a plurality of ambient pressure sensors 72; and, one or a plurality of moisture sensors 74. Other sensors may be employed within the scope of this disclosure, including, e.g., 3D geo-location sensors. The sensing devices 50 may be employed during each phase of fabricating the building 100, including the design phase, the fabrication phase, and the in-use phase.

The accelerometers 51, 52, 53 may be disposed to monitor portions of the building 100 at locations that may be deemed critical, including, e.g., one the vertical support core 12 at or near the base 28 (51), in a mid-section portion of the vertical support core 12 (52), and/or near a top portion of the vertical support core 12 (53). The accelerometers may employ piezo-electric or MEMS-based sensing elements. The specific locations may be identified during the building design phase and/or during the fabrication phase.

The strain gages 54, 55 may be disposed to monitor elements of the building 100 that may be subjected to stress/strain, including, e.g., at floor plate lock points 17 and the girders 30 of the floor plates 20. The strain gages 54, 55 may employ a mechanical sensing element in the form of a foil/resistive-based sensing device, or may instead employ optical, acoustic, pneumatic, electrical or other sensing technologies capable of detecting mechanical strain.

The vibration sensors 56 may be disposed at selected locations on each of the floor plates 20 to monitor vibration in the building 100, such as may be induced by fans, HVAC units, etc., and propagated in each of the floor plates 20. Vibration sensors 56 employ technology analogous to that of the accelerometers 51, 52, 53, and are tuned to frequency levels associated with the desired or expected monitored conditions.

The ambient and internal temperature sensors 58, 59, respectively, the ambient pressure sensors 72, and the moisture sensors 74 may be disposed to monitor temperatures at various locations in and around the building 100. One or more of the internal temperature sensors 59 may be disposed in or adjacent to elements of the floor plate assembly 21 to monitor temperature during curing of the hardenable material 22 during building the fabrication phase.

The horizontal deflection sensors 60 may be disposed on each of the floor plates 20 to monitor horizontal plumb or level thereof, employing laser or other technology.

The plumb/twist sensors 62 may be disposed on structural elements, such as the vertically-disposed structural rails 16 of the vertical support core 12. The plumb/twist sensors 62 may be in the form of mechanical strain gages that are configured to monitor two-dimension twist or torsion, optical fiber devices, or other configurations. The plumb/twist sensors 62 monitor twist and/or torsion in the structural rails 16.

The wind load sensors 64 may be disposed on the exterior walls 18 of the building 100 to monitor direct wind impingement and eddys.

The motion sensors 66 may be disposed at various locations in the building 100 to monitor effects of dynamic loads, movement of people, etc.

The solar load sensors 68 may be disposed on the exterior walls 18 of the building 100 to monitor solar impingement.

During the design phase, expected parameters related to deflections, vibration frequencies, etc. can be determined in response to internal and external loads that may occur during the fabrication phase and the in-use phase. The aforementioned inputs from the sensors can be monitored during the fabrication phase and the in-use phase and subjected to sensor fusion analysis. Sensor fusion analysis includes combining, aggregating and statistically analyzing data derived from the various sensors to make inferences about the in-use performance and structural integrity of the multi-story building and reduce uncertainty associated with information from individual ones of the sensors.

The building 100 also advantageously includes one or a plurality of active structural elements 25 that are capable of dynamically responding to information from one or more of the plurality of sensing devices 50. One example of the active structural element 25 is an active strut 25. An active strut 25 may be interposed between and attached to a first of the floor plates 20 and a second of the floor plates 20 at or near an outer periphery of the first and second of the floor plates 20. In one embodiment, the active strut 25 includes an elongated device having a first post section slidably disposed within a second post section. A damping actuator is interposed between the first post section and the second post section, and is arranged to dynamically control a position of the first post section in relation to the second post section. The active strut 25 may also include an accelerometer. The in-building controller 26 is in communication with the accelerometer and the damping actuator of the active strut 25 to control the damping actuator to control the position and movement of the first post section in relation to the second post section of the active strut 25. Thus, the active strut 25 can be employed to dynamically respond to changes between the first and second of the floor plates 20 to damp vibration or otherwise manage relative movement therebetween. This includes monitoring vibration and controlling the active strut 25 or another active structural element to damp the vibration. This includes monitoring floor deflection via the horizontal deflection sensors 60, and controlling the active strut 25 or another active structural element to minimize or control floor deflection. Furthermore, the active struts 25 may be controlled to increase stiffness to counteract deflections in the outer skin that may be due to changes in the service load on one of the floor plates 20. Furthermore, the active struts 25 may be controlled to adjust stiffness to counteract deflections in the outer skin that may be due to heat and solar loads on the exterior walls 18.

The sensing devices 50 are advantageously disposed on the building 100 to dynamically monitor various building conditions. The monitored building conditions can be analyzed, fused and otherwise evaluated to determine parameters that may be related to the structural integrity and/or the environmental health of the building 100. Such parameters include, by way of non-limiting examples: lateral deflection; lateral motion, i.e., swaying; vibration, including skin vibration; horizontal floor level for each of the floor plates 20; twisting of the vertically-disposed structural rails 16 and relative and absolute twisting of the floor plates 20; settling, including differential settling of the foundation 11 and the vertical support core 12; and, interfloor movements, including vertical deflections. Such evaluations can be periodically executed, e.g., once a minute, once an hour, or once a day. Such evaluation can be event-based, such as being correlated to external events such as wind shear or seismic activity. Such evaluation can be related to dynamic in-building loads, such as being correlated to movement of people, fluids (bathrooms, fire suppression, etc.), elevators, office/manufacturing equipment, etc.

The internal temperature sensors 59 may be disposed in or adjacent to elements of the floor plate assembly 21 to monitor temperature during curing of the hardenable material. In conjunction with inputs from one or more of the strain gages 54, 55 that are disposed to monitor associated stress loads on the floor plate assembly 21, curing of the hardenable material can be monitored and used to verify completeness of curing as part of a decision as to when to lift the respective floor plate 20.

Parameters associated with the hardenable material include density, modulus of elasticity, compressive strength, tensile strength, and shear strength.

Furthermore, inputs from the internal temperature sensors 59, inputs from one or more of the strain gages 54, 55, the horizontal deflection sensors 60, the vibration sensors 56 and accelerometers 51, 52, 53 may be subjected to sensor fusion analysis to evaluate the hardenable material during curing and in-use to detect occurrence of a fault, e.g., a fracture in the hardenable material of each of the floor plates 20.

Monitored parameters from the internal temperature sensors 59, the strain gages 54, 55, and the accelerometers 51, 52, 53 may be subjected to sensor fusion analysis to evaluate the structural integrity of the multi-story building.

Figure 2:
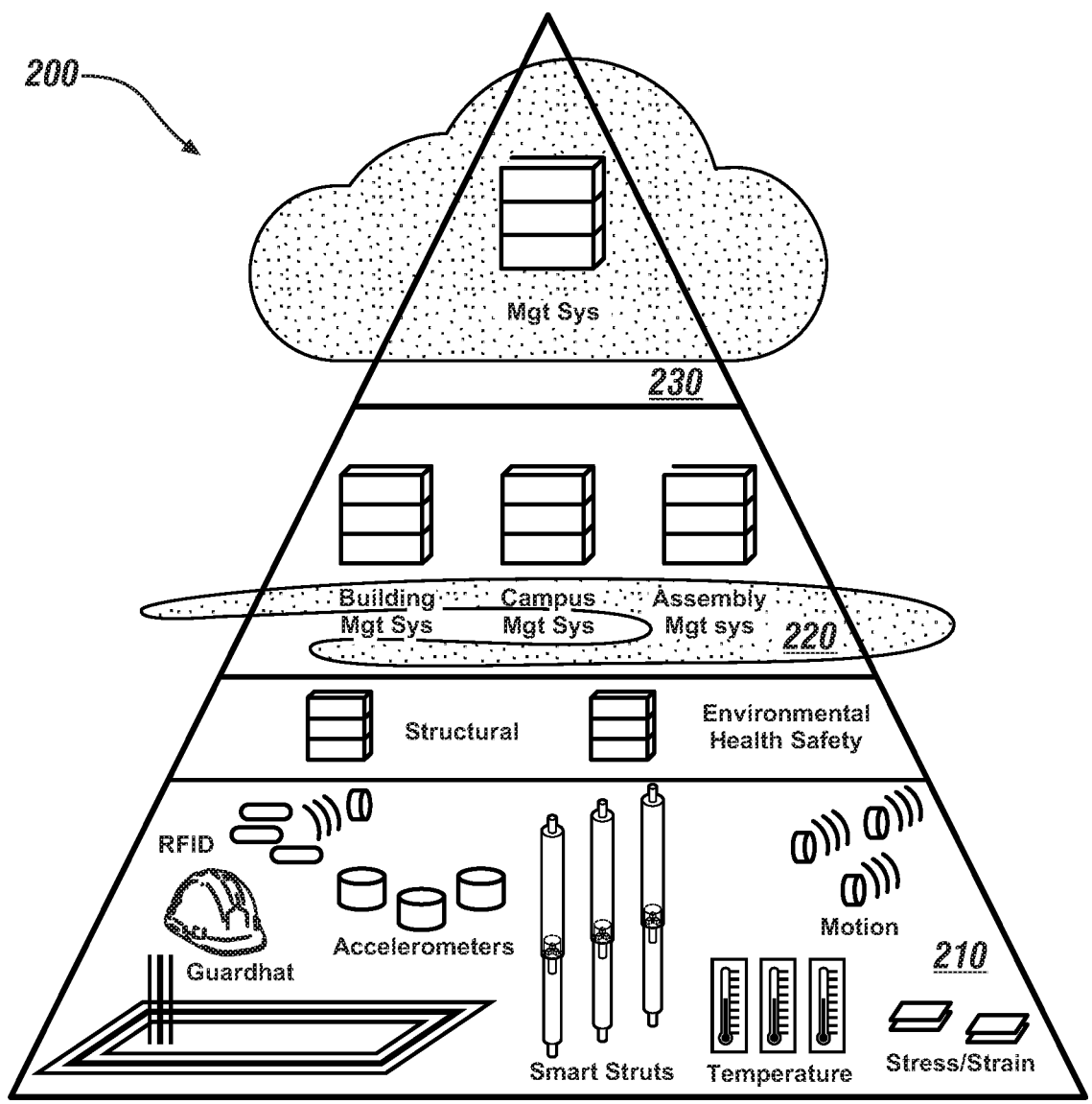
FIG. 2 is a schematic portrayal of a hierarchical concept for analyzing data available from the plurality of sensors disposed in the building to evaluate structural integrity and manage environmental health, in accordance with the disclosure.

FIG. 2 schematically shows a structure monitoring system 200 that is disposed in the building 100. The structure monitoring system 200 includes the controller 26 and the plurality of sensing devices 50 that are shown with reference to FIG. 1. The structure monitoring system 200 includes a first, edge-level analytical arrangement 210, a second, mid-level analytical arrangement 220, and a third upper-level analytical arrangement 230.

The first, edge-level analytical arrangement 210 includes a process for data management in which the data is dynamically monitored to evaluate the structural integrity and environmental health of the building, including employing sensor fusion and artificial intelligence. The controller 26, which may include a plurality of networked controllers that are in communication with the plurality of sensing devices 50 that are installed in various locations throughout the building 100 provide for autonomous, time-sensitive decision making. This closed, sensor fusion at the edge processing environment may be independent and may be isolated from other networks in the building 100. This microprocessor network provides real-time data gathering and analysis from the various sensing devices 50. The resulting sensor fusion is capable of immediate autonomous decision making for active structural elements 25 such as the active struts to guide an active structural response. The system may include or be integrated into a separate environmental building management system. This permits inputs that monitor the structural health of the building and facilitate quality control. The relative contribution of various load paths and structural efficiency may be affected by unexpected geophysical changes such as settlement or subsidence; and physical damage related to seismic events, fire or other causes. The environmental input measures external and internal conditions. The data may be used to manage and optimize a wide variety of building first and second and related actuators and systems, including energy management, lighting levels, vibration, fire and security systems, active shading systems.

The second, mid-level analytical arrangement 220 includes an intermediate level of computing capacity for data capture with limited storage capacity and analysis and management capability for a management system at the building, campus and assembly management levels, as required.

The third, upper-level analytical arrangement 230 includes data being captured and communicated to the second controller 27, which can be an element of an off-site, high-capacity data storage and computerized analytics service, such as a cloud-based controller. Non-time-sensitive data capture and analysis is performed at this cloud level. Using data from sensors and records of adjustments by operating elements such as the active structural elements 25, building structural health can be analyzed. The system may record base performance conditions, monitor condition of structural elements, monitor operation of active structural elements 25, facilitate a certification of building structural performance by a fabricator, autonomously compare historical data and newly-arriving data over time, facilitate analysis of structural damage and continuing usability following seismic activity or a fire, and facilitate developing repair and restoration plans, and anticipate needed maintenance. Data collected from the sensing devices 50 during operation may be used to adjust engineering premises and practices used for subsequently constructed buildings as well.

Utilizing edge sensing and sensor fusion, the structural automation system is capable of measuring and analyzing data from a wide variety of sensing devices mounted, embedded or concealed in construction. The system captures and analyzes initial and longer-term data to provide evidence of structural health of the building 100, facilitate a certification of building structural performance by the constructor, detect slowly-developing structural problems such as differential settlement before obvious damage appears, support active structural elements 25, facilitate analysis of structural health after extreme events such as fires and earthquakes, and anticipate maintenance requirements.

The term "controller" and related terms such as control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service, Platform as a Service, Infrastructure as a Service, etc.) and deployment models (e.g., private cloud, community cloud, public cloud, hybrid cloud, etc.).

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A multi-story building, comprising:
   a vertical support core disposed on a foundation, and a plurality of floor plates disposed on the vertical support core in a stacked arrangement, wherein each of the floor plates includes a floor plate frame that is fabricated from girders, framing members, and exterior walls;
   a plurality of sensors disposed to monitor the vertical support core and the plurality of floor plates, including a plurality of accelerometers disposed to monitor the vertical support core, a plurality of first strain gages disposed to monitor floor plate lock points of the vertical support core, a plurality of second strain gages disposed to monitor the girders of the floor plates, horizontal deflection sensors disposed on each of the floor plates to monitor a horizontal level of the respective floor plate, and plumb/twist sensors disposed on vertically-disposed structural rails of the vertical support core;
   a first controller, in communication with the plurality of sensors, the first controller including a memory device including an instruction set that is executable to:
      determine baseline inputs for the plurality of sensors;
      dynamically monitor in-use inputs for the plurality of sensors;
      evaluate the multi-story building based upon the baseline inputs and the in-use inputs from the plurality of sensors; and
      communicate the evaluation to a second controller.

2. The multi-story building of claim 1, further comprising an active structural element interposed between adjacent ones of the plurality of floor plates, wherein the active structural element is in communication with the first controller; and
   wherein the instruction set is executable to control the active structural element based upon the in-use inputs from the plurality of sensors.

3. The multi-story building of claim 1, wherein the instruction set executable to evaluate the multi-story building based upon the baseline inputs and the in-use inputs from the plurality of sensors comprises the instruction set executable to evaluate structural integrity of the multi-story building based upon the baseline inputs and the in-use inputs from the plurality of sensors.

4. The multi-story building of claim 3, wherein the instruction set executable to evaluate the structural integrity of the multi-story building based upon the baseline inputs and the in-use inputs from the plurality of sensors comprises the instruction set executable to evaluate the structural integrity of the multi-story building during building fabrication based upon the baseline inputs and the in-use inputs from the plurality of sensors.

5. The multi-story building of claim 3, wherein the instruction set executable to evaluate the structural integrity of the multi-story building based upon the baseline inputs and the in-use inputs from the plurality of sensors comprises the instruction set executable to evaluate in-use structural integrity of the multi-story building based upon the baseline inputs and the in-use inputs from the plurality of sensors.

6. The multi-story building of claim 1, wherein the instruction set executable to evaluate the multi-story building based upon the baseline inputs and the in-use inputs from the plurality of sensors comprises the instruction set executable to evaluate environmental health of the multi-story building based upon the baseline inputs and the in-use inputs from the plurality of sensors.

7. The multi-story building of claim 1, further comprising:
   the instruction set being executable to:
      dynamically evaluate environmental health of the multi-story building based upon inputs from the plurality of sensors; and
      communicate the evaluation of the environmental health to the second controller.

8. The multi-story building of claim 1, wherein the instruction set is executable to evaluate structural integrity of the multi-story building based upon baseline inputs and in-use inputs from the plurality of accelerometers, the plurality of first strain gages, the plurality of second strain gages, the horizontal deflection sensors, and the plumb/twist sensors.

9. The multi-story building of claim 1, wherein the plurality of sensors disposed to monitor the vertical support core and the plurality of floor plates further comprises a plurality of vibration sensors that are disposed to monitor vibration in the floor plates of the multi-story building, a plurality of ambient and internal temperature sensors, ambient pressure sensors, moisture sensors, and a plurality of motion sensors that are disposed to monitor the plurality of floor plates to monitor effects of dynamic loads.

10. The multi-story building of claim 9, wherein the instruction set is executable to evaluate environmental health of the multi-story building based upon baseline inputs and in-use inputs from the vibration sensors, the plurality of ambient and internal temperature sensors, the ambient pressure sensors, the moisture sensors, and the plurality of motion sensors.

11. The multi-story building of claim 1, wherein the instruction set is executable to dynamically evaluate structural integrity of the multi-story building based upon inputs from the plurality of accelerometers that are disposed to monitor the vertical support core.

12. The multi-story building of claim 1, wherein the instruction set is executable to dynamically evaluate structural integrity of the multi-story building based upon inputs from the first plurality of strain gages that are disposed to monitor floor plate lock points of the vertical support core.

13. The multi-story building of claim 1, wherein the instruction set is executable to dynamically evaluate structural integrity of the multi-story building based upon inputs from the second plurality of strain gages that are disposed to monitor the girders of the floor plates.

14. A method for operating a multi-story building including a vertical support core having a plurality of floor plates disposed thereon in a stacked arrangement, the method comprising:
  monitoring, via a plurality of sensors in communication with a first controller, the vertical support core and the plurality of floor plates, wherein the plurality of sensors includes a plurality of accelerometers disposed to monitor the vertical support core, a plurality of first strain gages disposed to monitor floor plate lock points of the vertical support core, a plurality of second strain gages disposed to monitor the girders of the floor plates, horizontal deflection sensors disposed on each of the floor plates to monitor a horizontal level of the respective floor plate, and plumb/twist sensors disposed on vertically-disposed structural rails of the vertical support core;
  evaluating, via the first controller, the vertical support core and the plurality of floor plates based upon the monitoring via the plurality of sensors; and
  communicating the evaluation to a second controller.

15. The method of claim 14, further comprising:
  interposing an active structural element between adjacent ones of the plurality of floor plates; and
  controlling the active structural element based upon the monitoring via the plurality of sensors.

16. The method of claim 15, wherein monitoring, via a plurality of sensors, the vertical support core and the plurality of floor plates comprises monitoring the vertical support core and the plurality of floor plates via a plurality of vibration sensors; and
  wherein controlling the active structural element based upon monitoring via the plurality of sensors comprises controlling the active structural element based upon inputs from the plurality of vibration sensors.

17. The method of claim 15, comprising
  monitoring inputs from the plurality of horizontal deflection sensors disposed on the vertical support core and the plurality of floor plates; and
  controlling the active structural element based upon inputs from the plurality of horizontal deflection sensors.

18. The method of claim 14, wherein monitoring, via a plurality of sensors, the vertical support core and the plurality of floor plates comprises monitoring inputs from a plurality of temperature sensors disposed on the vertical support core and the plurality of floor plates.

19. The method of claim 18, wherein monitoring the inputs from the plurality of temperature sensors disposed on the vertical support core and the plurality of floor plates comprises monitoring, via the plurality of temperature sensors, curing of a hardenable material disposed on one of the floor plates.

20. The method of claim 14, comprising
  monitoring inputs from the first and second pluralities of strain gages disposed on the vertical support core and the plurality of floor plates;
  and
  evaluating structural integrity of the vertical support core and the plurality of floor plates based upon inputs from the the first and second pluralities of strain gages.

21. The method of claim 14, wherein evaluating, via the first controller, the vertical support core and the plurality of floor plates based upon the monitoring via the plurality of sensors comprises evaluating structural integrity of the multi-story building based upon baseline inputs from the plurality of sensors.

22. The method of claim 21, wherein evaluating the structural integrity of the multi-story building based upon the inputs from the plurality of sensors includes evaluating the structural integrity of the multi-story building during building fabrication based upon the inputs from the plurality of sensors.

23. The method of claim 21, wherein evaluating the structural integrity of the multi-story building based upon the inputs from the plurality of sensors comprises evaluating the structural integrity of the multi-story building in-use based upon the baseline inputs and inputs from the plurality of sensors.

* * * * *